United States Patent [19]

Gerken et al.

[11] Patent Number: 5,729,744

[45] Date of Patent: Mar. 17, 1998

[54] METHOD AND SYSTEM OF ENHANCED VERSIONING CONTROL OF OBJECTS IN A DATA PROCESSING SYSTEM USING CHANGE CONTROL INFORMATION WHICH INCLUDES REASONS FOR CHANGES

[75] Inventors: Christopher Henry Gerken, Apex; Stacy Renee Joines, Raleigh, both of N.C.

[73] Assignee: International Business Machine Corp., Armonk, N.Y.

[21] Appl. No.: 665,030

[22] Filed: Jun. 10, 1996

[51] Int. Cl.$^6$ .................................................. G06F 17/30
[52] U.S. Cl. .................. 395/619; 395/614; 395/603; 395/703; 395/601; 395/500
[58] Field of Search ..................... 395/614, 703, 395/721, 601, 500, 603, 619

[56] References Cited

U.S. PATENT DOCUMENTS

| | | | |
|---|---|---|---|
| 4,558,413 | 12/1985 | Schmidt et al. | 364/619 |
| 4,809,170 | 2/1989 | Leblang et al. | 395/703 |
| 5,287,496 | 2/1994 | Chen et al. | 395/619 |
| 5,317,729 | 5/1994 | Mukherjee et al. | 395/603 |
| 5,581,755 | 12/1996 | Koerber et al. | 395/614 |
| 5,588,143 | 12/1996 | Stupek, Jr. et al. | 395/500 |
| 5,623,661 | 4/1997 | Hon | 395/601 |

OTHER PUBLICATIONS

Gulla et al. "Change–Oriented Version Descriptions in EPOS", software Engineering Journal, v.6, N.6, pp. 378–386. Nov. 1991.

*Primary Examiner*—Thomas G. Black
*Assistant Examiner*—Charles L. Rones
*Attorney, Agent, or Firm*—A. Bruce Clay

[57] ABSTRACT

Library management systems are used in data processing systems as a repository for objects such as computer programming code, textual information and various other types of data. Any object may be taken from the library, modified and returned as a new version. Several new versions may be created, each of which may also have new versions created, making it difficult to obtain the "correct" version. To resolve this difficulty, all versions are associated with their changes in order to determine whether a requested action, such as promoting a version from test to production, is allowable and truly desired. Thus, when an action is requested in terms of a number of reasons and a baseline version, any additional reasons for change associated with versions between the baseline and the desired version are determined. It is also determined whether there is a single version that encompasses exactly those versions created for the specified reasons from the baseline version.

12 Claims, 10 Drawing Sheets

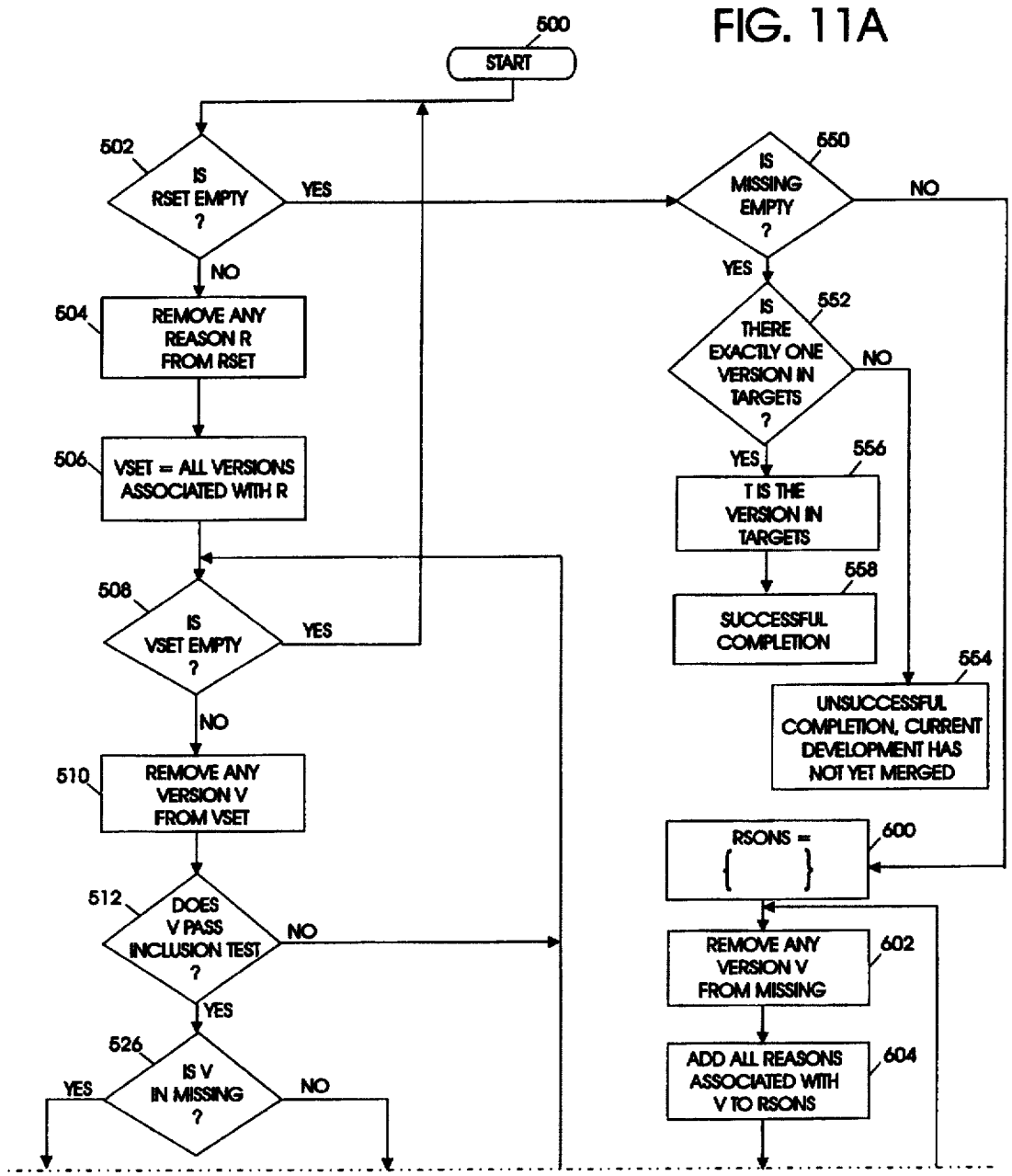

METHOD AND SYSTEM OF ENHANCED VERSIONING CONTROL OF OBJECTS IN A DATA PROCESSING SYSTEM USING CHANGE CONTROL INFORMATION WHICH INCLUDES REASONS FOR CHANGES

TECHNICAL FIELD OF INVENTION

The present invention relates in general to a data processing system, and in particular to an improved method and system for controlling versions of objects that makes use of the change control history of the objects.

BACKGROUND OF THE INVENTION

A library management system or facility in a data processing system is a repository for objects such as, for example, computer programming code, related textual information, and various types of data. An "object" is anything that may exist or occupy space in storage within a data processing system and upon which operations can be performed; for example, programs, files, libraries, directories and folders. A "version" is a logical representation of an object's state, as stored by the library manager. For example, a document is an object and any modifications to the document will result in a new version. A change or modification to the version results in yet another version of the document. Consequently, an object may have a single (it is possible that an object can have more than one original version) original version along with many versions originating therefrom.

As with other "library management systems", information may be taken from the system for use. The information also may be changed as a result such use or from additional data becoming available. The altered information may then be returned to the library, either unchanged or modified, resulting in the creation of a new version. A library should be organized so that information can readily be retrieved and returned to its proper place. It is most desirable that the information in the library be arranged so that it can be retrieved, replaced, and modified quickly. Moreover, it is desirable to be able to store each object efficiently, utilizing a minimum amount of computer storage, typically disk storage. Such storage can be controlled by storing a full copy of only some versions and subsequently storing only the changes to each version rather than all of the other versions.

One problem found in library management systems is the fact that objects may often be modified to produce new versions. Such versions may be introduced to provide either a new or improved function (feature) to an object or to correct errors (defects) in an object. Additionally, new versions may be created to add data to an object. A computer program is an example of an object that may often be modified. In the case of computer programs, generally speaking, successful computer programs in the market typically have many versions of the program, which are sequentially released with modifications to improve the program. This situation is particularly true for programs that operate on large computer systems, such as a main frame computer.

The presently available system for a library management follow two models well known to those skilled in the art: (1) the branching model or (2) The hierarchial promotion model. The branching model stores versions and derivation histories of objects outlining the relationship between versions. Unless explicitly deleted by a user, any version saved under this model is always recoverable. Additionally, the branching model allows for concurrent development. In other words, the branching model allows various programmers or users to modify a particular version of an object at the same time. FIG. 1 is a block diagram illustrating a branching model known in the prior art. Object 150 has number of versions. Object 150 was originally created as version 1.0, as illustrated in block 152. A modification of version 1.0 sent back to a library manager creates version 1.1, as illustrated in block 153. Version 1.2, depicted in block 154 was created by a modification to version 1.1 sent back to the library manager. Similarly, version 1.3, at block 156, is based on version 1.2. Object 150 has a parallel branch created from version 1.2 This version is version 1.2.1.0, as depicted in block 158. Version 1.2.1.1, as illustrated in block 160, was created from some alteration of version 1.2.1.0. Similarly, version 1.2.1.2, at block 162, was created from a change to version 1.2.1.1. Label 164 and label 166 are simple string labels attached to a particular version in the branching model of object 150.

A user may therefore retrieve any version located in this branching model by identifying the version model, for example, 1.0, 1.1, etc. Additionally, a version may be identified and retrieved by a string label if that version has a string label associated with it. Additionally, merger of versions may be accomplished by supplying the two versions to be modified and the common base version to the two versions. Unfortunately, no mechanism is provided to force a merger of two concurrent developments in the branching model.

The hierarchial promotion model provides a multiple concurrent views of objects in various levels, e.g., in development, testing, and in production. A hierarchial promotion model controls objects as they are changed and promoted. In addition, concurrent development may be prevented or indicated by the promotion hierarchial model. In this matter, at most one version of an object may be seen in a group by a user or group of users.

Referring now to FIG. 2, a block diagram illustrating a hierarchial promotion model is depicted. In this model, groups are formed for various stages in a development process for an object and act as an index into the set of versions for each object. In this particular example, the objects are programs. Group 170, "Field," refers to the version of each program in production. Group 172 is a "Test" group set up for testing programs. Groups 174 and 176 represent development groups "One" and "Two" in which programs are developed for use. Group 178 is an "Error" group defined for testing programs in the field corrected for errors. Group 180 and 182 represent "Three" and "Four" groups for correction of errors. A programmer in group 174 may modify program AC.4 (program AC, version 4), a programer in group 176 may modify a different program such as BC.9 (program BC, version 9). If the programmer utilizing group 176 desired to examine a program AC, the programmer would see AC.1 (program AC, version 1). No access is allowed to AC.1 from group 176 until a promotion occurs. For example, if a programmer in group 174 finishes working on AC.4, that programmer may promote or shift AC.4 into group 172 for testing. Program AC.4 may be again promoted to group 170. In such a case, AC.1 would be replaced by AC.4 in group 170.

In contrast to the branching model various versions are reassigned labels depending on promotion of the version. In a hierarchial promotion model, versions may be moved or promoted up to the structure and copied down the structure for modification.

The branching model provides the features of allowing recovery of any version in concurrent development of versions. On the other hand, the hierarchial promotion model does not provide for these features. However, the hierarchial promotion model provides for searching paths for versions, alerting or preventing concurrent developments, preventing promotions that lose data, easy modification of development processes, ensuring only one version of an object is within a group, enforces promotion paths, and automatically relabels versions upon modification. Although the two models provide similar functions, each model provides features not available from the other. As a result, users choosing one model over another will have to forego the use of features offered by the model not chosen.

Application Ser. No. 08/492,389 filed Jun. 19, 1995 which is a continuation of Ser. No. 08/031,757 (now abandoned) by the assignee herein provided beneficial features from both the branching and hierarchial models and is incorporated herein by reference. However, there is no teaching of the use of defect/feature tracking. Thus it is desirable to provide a method to reduce the likelihood of loosing changes made to a version by including defect/feature tracking

SUMMARY OF THE INVENTION

By associating a reason with every version changed for that reason, the present invention allows a user to specify development, maintenance and support (for example) actions in terms of an existing baseline version and a set of reasons for which changes were made.

EXAMPLES

1) Print the version of the contract agreed upon last week, but only with the changes Al and not Bob made this week.

2) Ship a version of the program that fixes the problems reported by a specific user.

Because changes can result in an unlimited number of sequential and/or concurrent versions of controlled objects, the present invention ensures that the target version for these actions contains only those specified changes and all of the specified changes. Furthermore, the invention ensures that there is a single version that incorporates all of those changes.

BRIEF DESCRIPTION OF THE DRAWINGS

For a more complete understanding of the present invention and for further advantages thereof, reference is now made to the following Detailed Description taken in conjunction with the accompanying Drawings, in which.

DETAILED DESCRIPTION OF THE INVENTION

Figure 3:
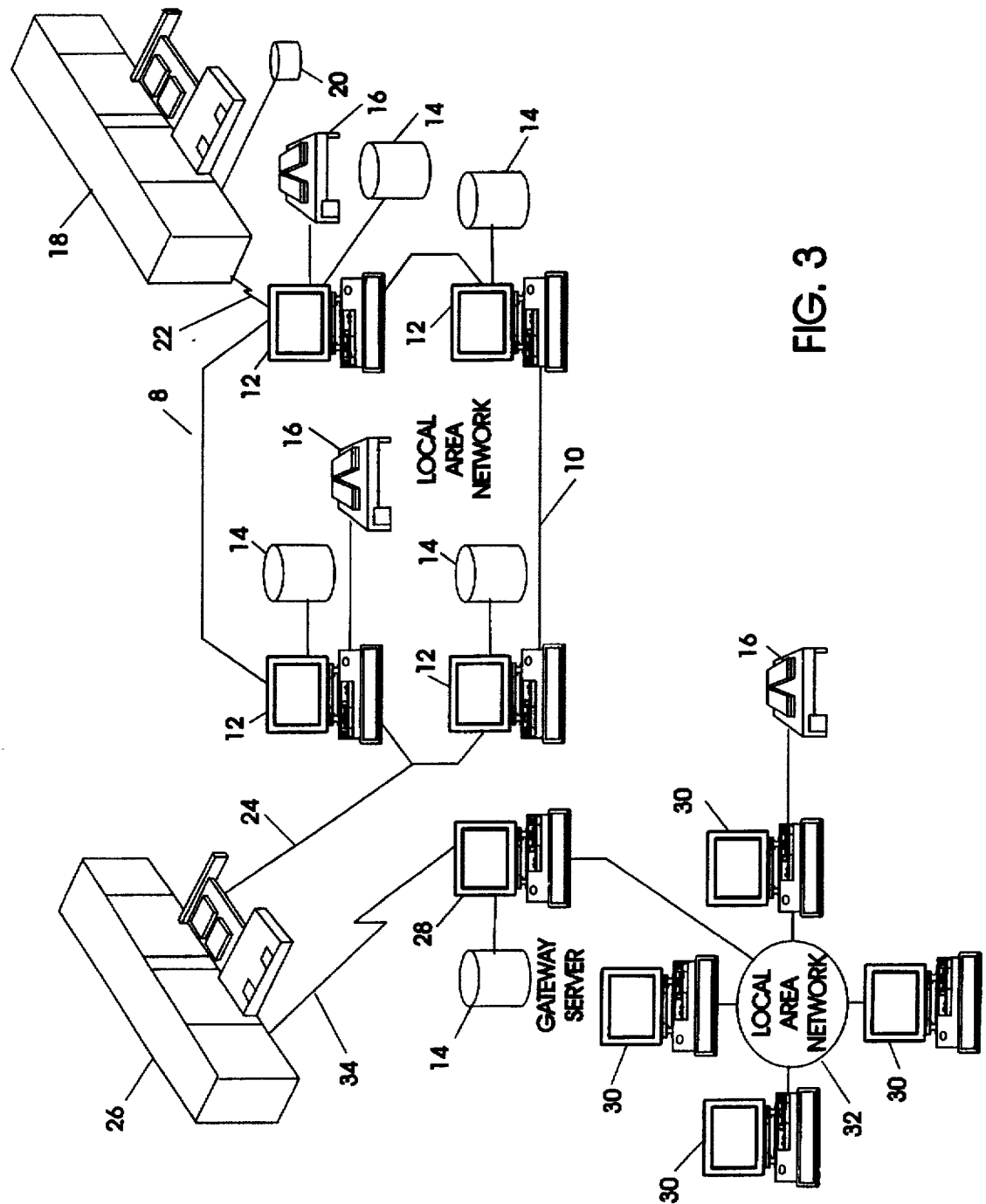
FIG. 3 is a pictorial representation of a data processing system which may be utilized to implement the method and system of a present invention.

Referring to FIG. 3, there is depicted a graphical representation of a data processing system 8, which may be utilized to implement the present invention. As may be seen, data processing system 8 may include a plurality of networks, such as LAN 10 and 32, each of which preferably includes a plurality of individual computers 12 and 30, respectively. Of course, those skilled in the art will appreciate that a plurality of intelligent work stations (IWS) coupled to a host processor may be utilized for each such network. As is common in such data processing systems, each individual computer may be coupled to a storage device 14 and/or a printer/output device 16.

The data processing system 8 may also include multiple mainframe computers, such as mainframe computer 18, which may be preferably coupled to LAN 10 by means of communications link 22. The main frame computer 18 may also be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or IWS which serves to link LAN 32 to LAN 10.

With respect to LAN 32 and LAN 10, a plurality of documents or resource objects may be stored within storage device 20 and controlled by mainframe computer 18, as Resource Manager or Library Service for the resource objects thus stored. Of course, those skilled in the art will appreciate that mainframe computer 18 may be located a great geographic distance from LAN 10 and similarly LAN 10 may be located a substantial distance from LAN 32. For example, LAN 32 may be located in California while LAN 10 may be located within North Carolina and mainframe computer 18 may be located in New York.

Software program code which employs the present invention is typically stored in the storage device 14 or 20, from which a developer may access the code. For distribution purposes, the software program code may be embodied on any of a variety of known media for use with a data processing system, such as a diskette or CD-ROM, or may be distributed to users from the memory of one computer system over a network of some type to other computer systems for use by users of such other systems. Such techniques and methods for embodying software code on media and/or distributing software code are well known and will not be further discussed herein.

Figure 4A:
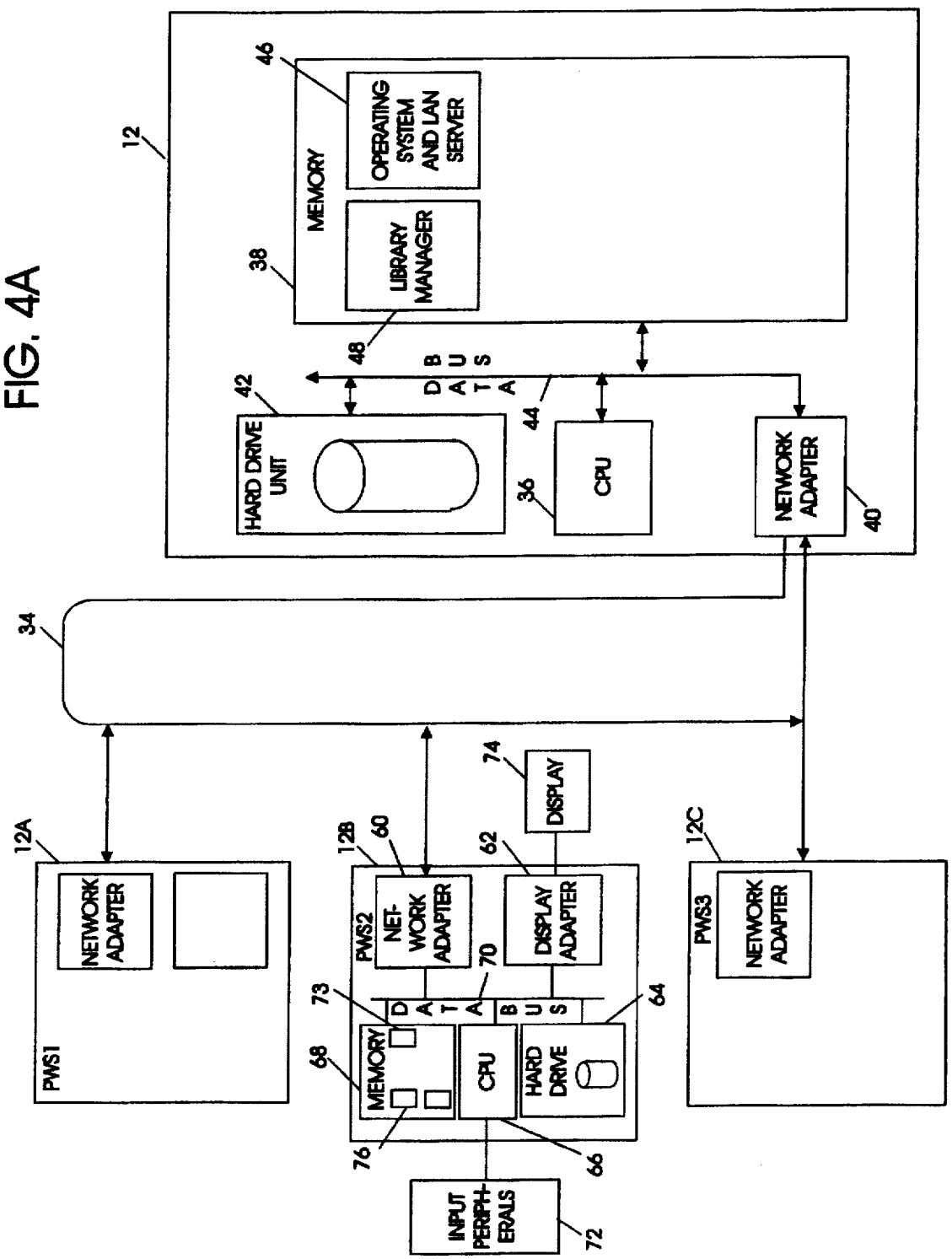
FIG. 4A depicts a block diagram of a LAN from the data processing system of FIG. 3.

Referring now to FIG. 4A, a block diagram of LAN 10 is depicted for implementing a method and system of the present invention. Server 12 communicates with computers 12a–12c over communications channel 34. LAN 10 is depicted in a token ring geometry, however, other geometries are possible. Server 12 may be a conventional computer, such as an IBM PS/2™ or AS/400™ system programmed to practice this invention. Server 12 includes a central processing unit (CPU) 36, a memory 38 and a network adapter 40. Network adapter 40 is utilized for formatting outgoing transmissions and for deformating incoming transmissions. Server 12 also includes a hard drive unit 42 for storing various revisions of objects pending a request for access by one or more users. Such a request results in the transfer of a version of an object to computer memory 38 over data bus 44. A number of objects may exist within memory 38. An operating system and local area network server 46 are represented as one object within memory 38.

Various users may access versions by sending a request to library manager 48 utilizing computers 12a–12c. Computer 12b is a typical example. Computer 12b operates as a personal workstation communicating with server 12. Schematically, computer 12b is substantionally similar to server 12, and includes a network adapter 60, a display adapter 62, a hard drive unit 64, a CPU 66, an addressable memory 68. Components of computer 12b transfer data over data bus 70. CPU 66 directly controls input peripherals 72, which may include a keyboard and a mouse. Display adapter 62 drives display device 74. Memory 68 includes operating system 73. Memory 68 also includes version 76, which was supplied by computer 12 in response to a request to library manager 48. Additionally, computer 12b also may have a library manager (not shown) in memory 68.

Figure 4B:
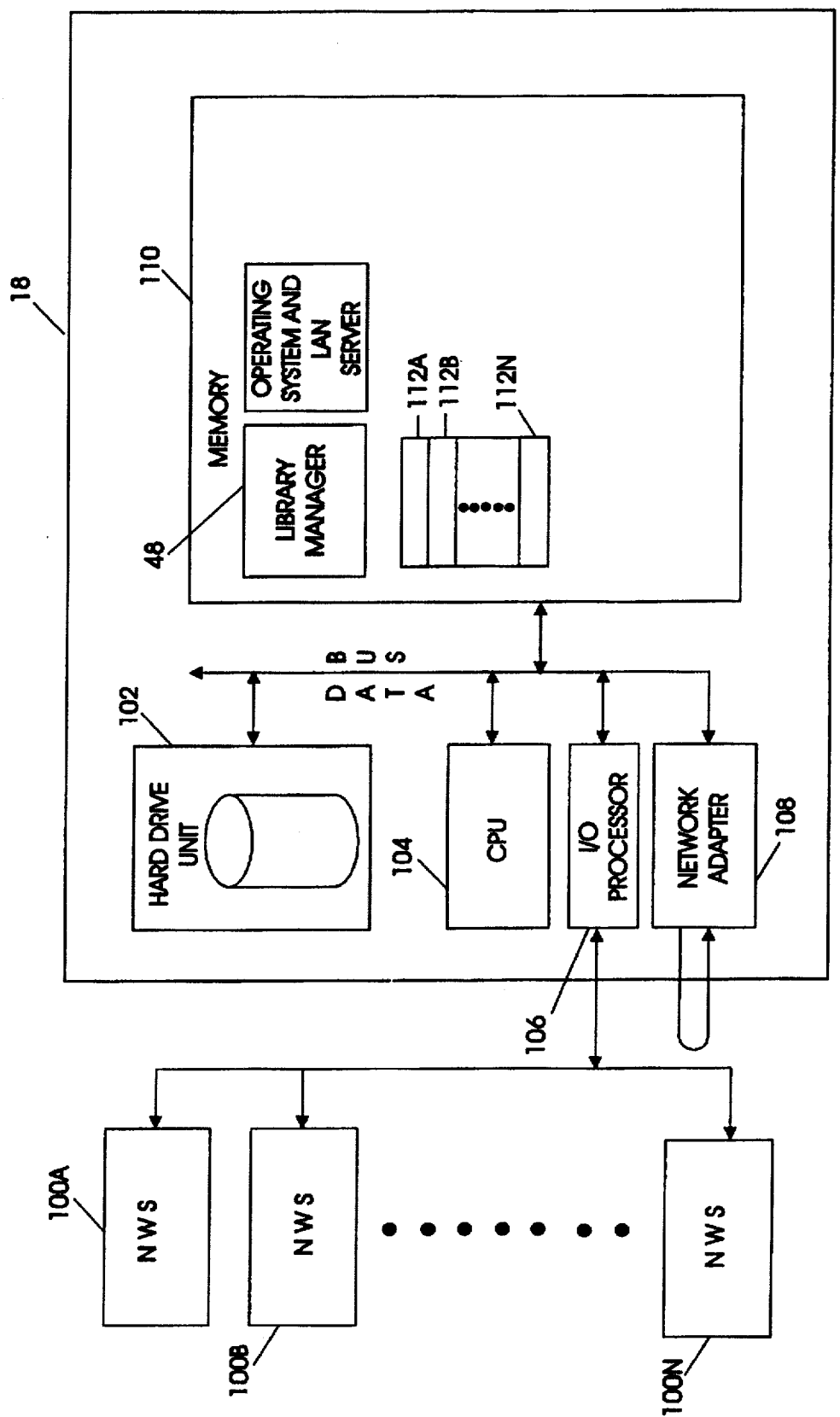
FIG. 4B depicts a block diagram of a mainframe computer from FIG. 3.

Referring now to FIG. 4B, a block diagram of mainframe computer 18 is depicted. Mainframe computer 18 is a single computer system running multiple processes, such as an IBM™ ESA/370™ or ESA/390™ attached to multiple non-programmable work stations (NWS) 100a–100n. Mainframe computer 18 includes a hard drive unit 102, CPU104, input/output (I/O) processor 106 for communicating with nonprogrammable work stations 100a–100n, network adapter 108, and memory 110. Hard drive unit 102 may contain versions managed by library manager 48 located in memory 110. Each nonprogrammable work station may access a version located within memory 110. For example, nonprogrammable work station 100a would access version 112a, nonprogrammable work station 100b would access version 112b, and nonprogrammable work station 100n would access version 112n.

Figure 5:
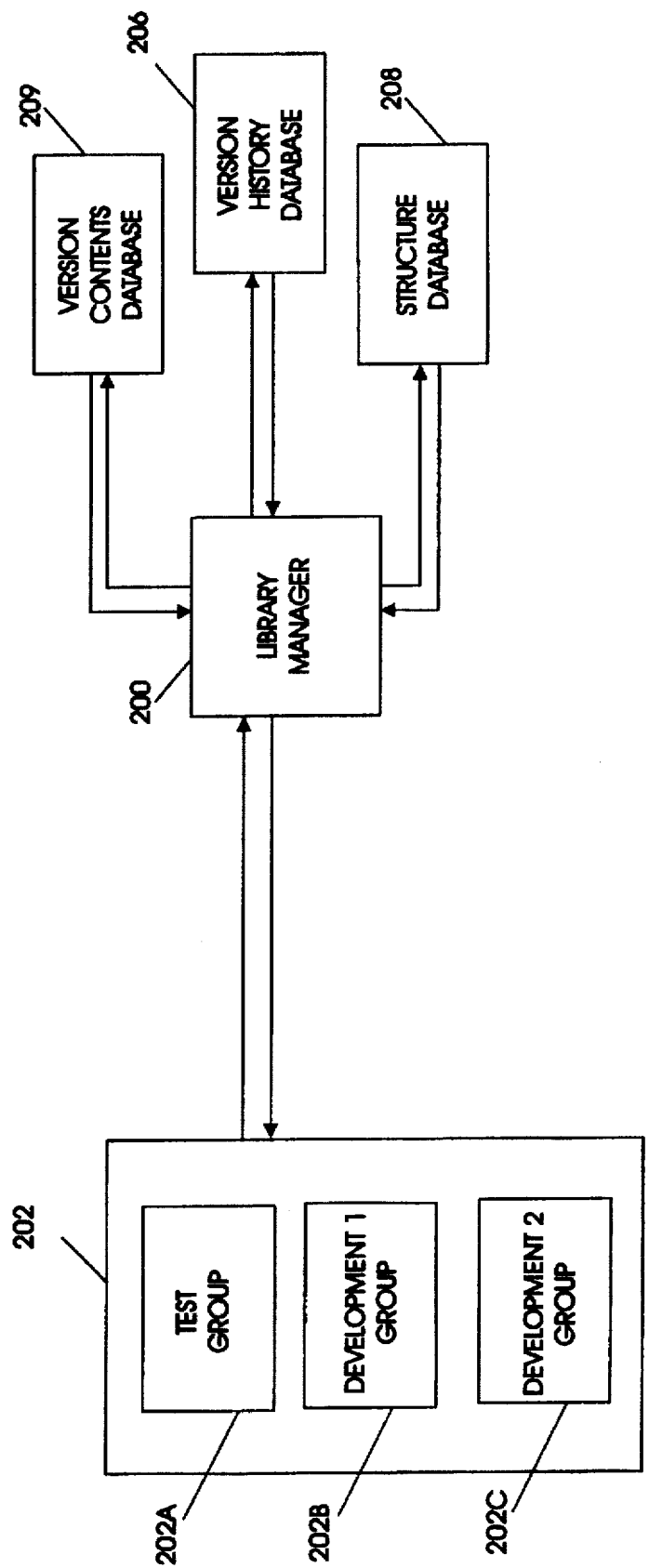
FIG. 5 is a block diagram illustrating a library management system in accordance with the present invention.

Referring now to FIG. 5, a block diagram illustrates a library management system. Library manager 200 preforms various functions in response to requests from users 202. Users 202 may be divided into groups 204a–204c, although any user may use another group. The library management system also includes the version history database 206, a version contents database 209 and a structure database 208. Version history database 206 may include derivational history of the objects, and the versions themselves are located in version contents database 209. Structure database 208 contains the information organizing the groups into a hierarchial promotion structure.

Figure 6:
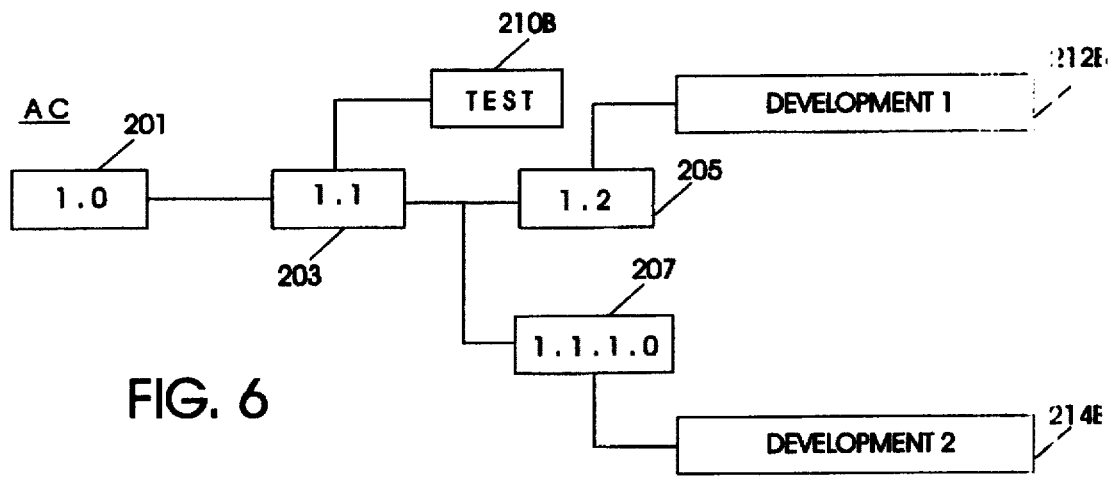
FIG. 6 depicts a block diagram illustrating a version database in accordance with the present invention.

Referring now to FIG. 6, a block diagram illustrating a version database is depicted. In this example, version history database 206 contains one object having versions 1.0, 1.1, 1.2, and 1.1.1.0 as depicted in blocks 201, 203, 205, and 207, respectively. The contents or data for the version are stored in version contents database 209. Version 1.0 is the original version with version 1.1 being created by modifying version 1.0. Version 1.2 is a result of a modification to version 1.1. Similarly, version 1.1.1.0 resulted from a modification or change to version 1.1. Status labels may be utilized to identify various versions. For example, version 1.1 is labeled "Test," depicted in block 210b, version 1.2 is "DEVELOPMENT 1," illustrated in block 212b, and version 1.1.1.0 is labeled "DEVELOPMENT 2," shown in block 214b. The version's names and their relations to other versions are stored in a version history database 206. Alternatively, the version history database 206 and the version contents database 209 may be combined into a single database. Retrieval of data comprising a version based on the version name is well known to those skilled in the art.

Figure 7A:
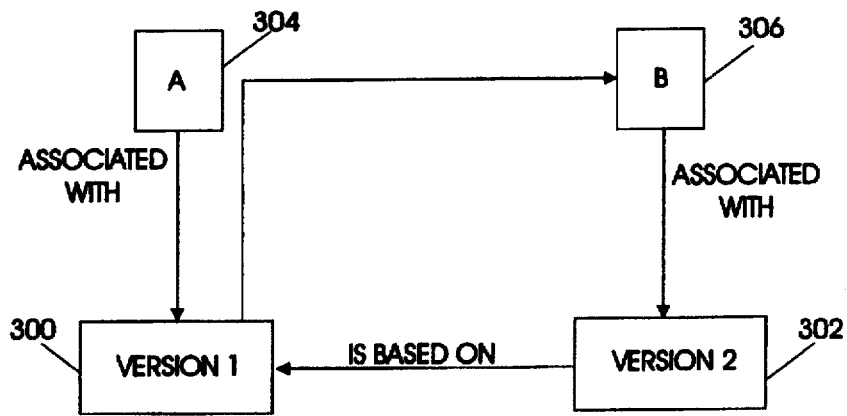
FIGS. 7A and 7B depict change control and consistency.

In accordance with the present invention, reasons for change are associated with versions. A reason is an object that describes why one or more new versions of a library manager object were created. Prior art describes how Library Managers associate reason objects with the appropriate versions of library-managed objects. Referring to FIG. 7A, an example illustrating consistency is shown. Version 1 generally indicated by a reference numeral 300 is a version which was created due to a reason A, generally indicated by reference numeral 304. A reason such as reason A may be a fix to a problem, a feature enhancement, or etc. Version 1 was subsequently modified for reason B, generally indicated by reference numeral 306, into version 2, generally indicated by reference numeral 302. Since version 2 includes changes made for reason A, it is said that reason A is a prerequisite for reason B. For this reason when an action is taken against a version, the present invention determines all of the versions and their associated changes in order to further determine whether the requested action is allowable and truly desired. When a user asks for an action against the single version of the object that incorporates changes made for reason B, the requested action will also involve any changes made before version 2 was created (namely, changes made for reason A). Therefore, when an action is requested in terms of a number of reasons and a baseline version, the present invention determines whether there are any additional reasons for change associated with versions "between" the baseline and the desired version. In addition, the present invention verifies that there is a single version that encompasses exactly those versions created for the specified reasons from the baseline version.

Figure 7B:
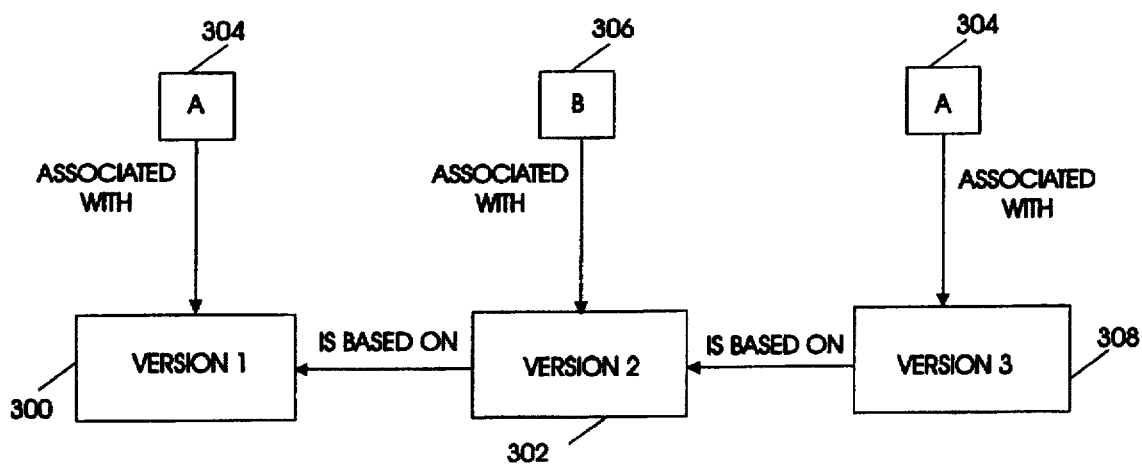

Continuing the example of FIG. 7A, a test of whether a set of versions and changes is complete is illustrated in FIG. 7B. After creating version 2, the user makes another set of modifications for reason A again, creating a version 3, generally indicated by reference numeral 308. Now when an action is taken against Version 2, the set of versions and changes is not complete since there are modifications made for reason A which are not included in version 2. While completeness is not a required pre-condition for library actions, it is crucial that the architecture be able to evaluate whether a version is complete with respect to known changes.

In accordance with the present invention, The following terms are herein defined:

Target version=a version requested by the user in terms of an earlier baseline version and a set of reasons for which the object was changed;

Baseline version=some known version, referred to by name or by label;

Original version=pristine version before any modifications (including creation) were made;

Ancestor Version=a previous version (not necessarily the immediately previous); and Descendant version=a subsequent (not necessarily immediate) version.

Figure 8:
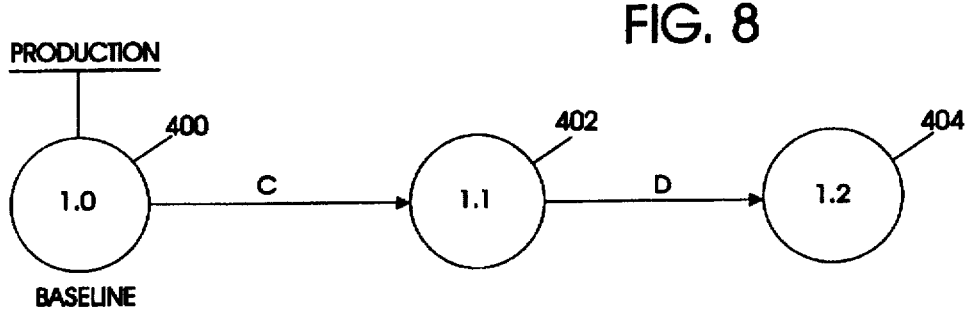
FIG. 8 depicts a case 1 example of sequential version development.
Figure 9:
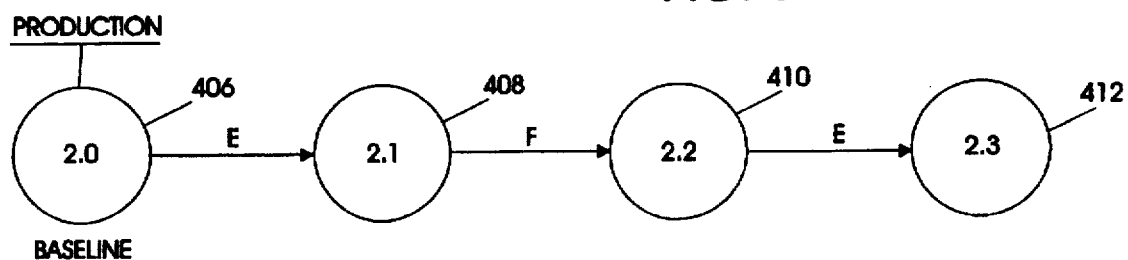
FIG. 9 depicts a case 2 example of modified sequential version development.
Figure 10:
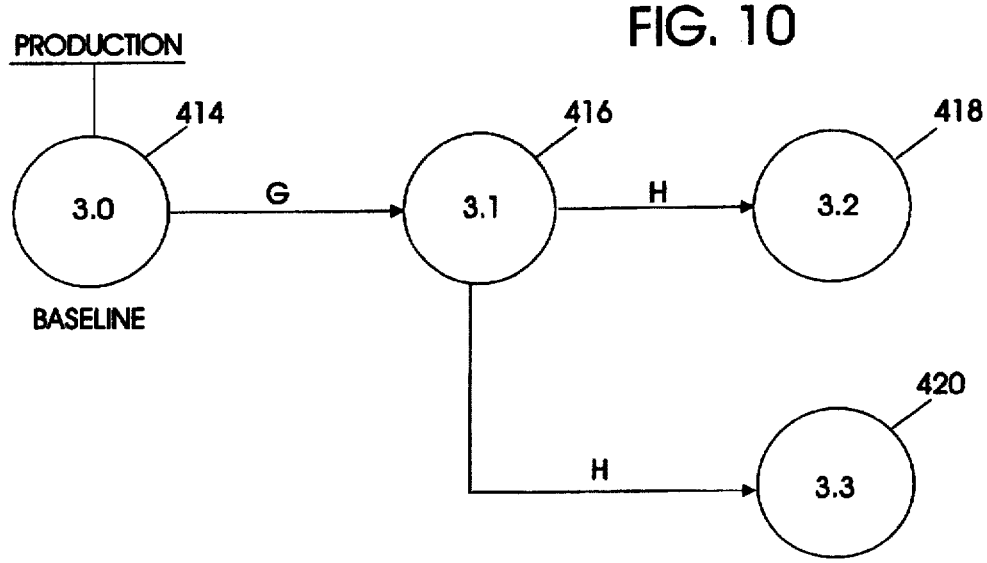
FIG. 10 depicts a case 3 example of concurrent version development.

In accordance with the present invention, three examples are shown in FIGS. 8, 9, & 10. Referring first to FIG. 8, a case 1 example is illustrated. A baseline version 1.0, indicated by reference numeral 400, is the version currently in production. Version 1.1, generally indicated by the reference numeral 402, has been created for a reason C. Subsequently, Version 1.2, generally indicated by reference numeral 404, is created for a reason D.

Referring next to FIG. 9, an example Case 2 is illustrated. In Case 2, a baseline production Version 2.0 is generally identified by reference numeral 406. Version 2.0 was modified for reason E into Version 2.1, generally identified by reference numeral 408. Version 2.1 was then modified for reason F into Version 2.2, generally identified by reference numeral 410. Version 2.2 was modified into Version 2.3, generally identified by reference numeral 412, again for reason E. Reason E may be the cause for two separate modifications for various reasons such as, for example, a fix applied to a version was insufficient or itself contained errors and therefore a modification would be applied again for the same reason.

FIG. 10 illustrates Case 3 in which a production baseline version 3.0 is generally identified by the reference numeral 414. Version 3.0 was modified into Version 3.1, generally identified by the reference numeral 416, for a reason G. Version 3.1, was modified into Version 3.2, generally identified by the reference numeral 418 and Version 3.3, generally identified by reference numeral 420 for a reason H. Version 3.2 and 3.3 may have been created for the same reason H, due to inadvertent concurrent development by separate programmers or other reasons.

Figure 12:
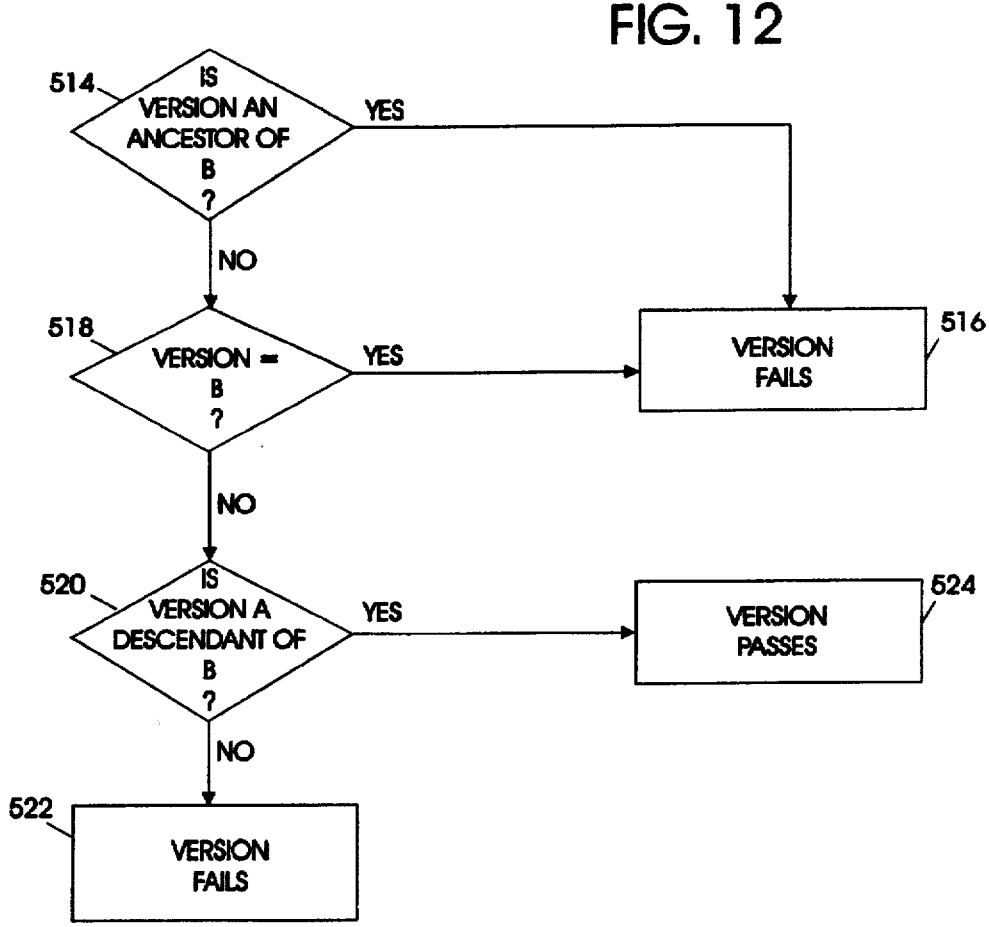
FIG. 12 illustrates an inclusion test used with the present invention.
Figure 11B:
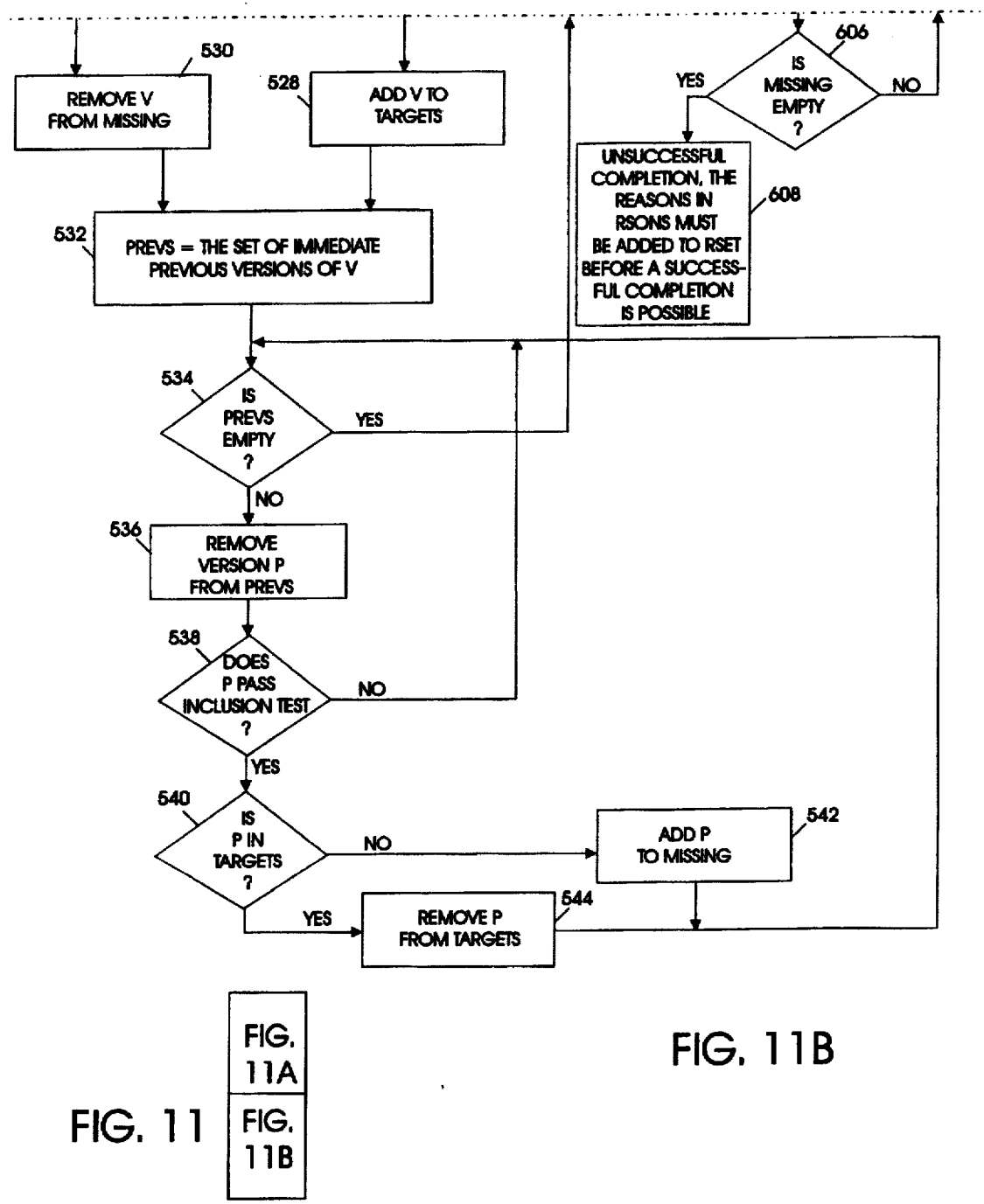
FIG. 11 comprises of FIGS. 11A and 11B which illustrates a flow chart implementation of the present invention.

Referring next to FIGS. 11 and 12, a flowchart illustrates the present invention with reference to the three cases shown in FIGS. 8, 9 & 10. The following variables are used:

Baseline(a version specified by the user, either explicitly by version id or indirectly (eg. by label));

T (the target version; ie the version that the present invention will determine to be the version against which an action (eg. promotion) is to be taken);

RSET (a set of reasons provided by the user and whose associated changes must all be incorporated by the target version);

R (one specific reason from RSET; used to iterate through RSET);

VSET (a set of versions associated with the current reason R);

V (one specific version from VSET (used to iterate through VSET); or one specific version from MISSING);

MISSING (a set of previously unencountered versions that have an immediate ancestor that has been encountered);

TARGETS (a set of potential target versions; the present invention, when it runs successfully, will eventually remove all but one version from the list);

PREVS (a set of immediate previous versions for the current version V);

P (one specific version from PREVS).

RSONS (a set of reasons that (1) are not in the original RSET and (2) are associated with versions between the baseline and target).

Starting with Case 1 as shown in FIG. 8, it is desired to in some way act against (ie, promote) the version that contains modifications for reasons C and D to the production version. As initial steps, MISSING and TARGETS are set to be empty. Referring to FIG. 11, the present invention starts at 500. Initially, the variables are: Baseline=1.0; and RSET= {C,D}. It is first determined at decision block 502 whether or not RSET is empty. In case 1, RSET={C,D}, and thus is not empty. In block 504, any reason R is then removed from RSET (in case 1, first set reason R=reason D). In block 506, VSET is set equal to all versions associated with the reason R from block 504. In case 1, VSET={version 1.2}. It is then determined at decision block 508 whether or not VSET is empty. If the response to decision block 508 is yes, the present invention returns to decision block 502. If the response to decision block 508 is no, any version V is removed from VSET (for Case 1, version V=1.2). VSET is now empty. It is then determined in decision block 512 whether or not version V (version 1.2) passes the inclusion test shown in FIG. 12.

Referring to FIG. 12, it is determined at decision block 514 whether or not the Version (version 1.2) is an ancestor of B (B=baseline version; i.e. version 1.0). If the response to decision block 514 is yes, the version fails at block 516. If the response to decision block 514 is no (version 1.2 is in fact a descendent version of version 1.0), it is determined at decision block 518, whether or not the version (version 1.2) is equal to B (version 1.0). If the response to decision block 518 is yes, the version fails at block 516. If the response to decision block 518 is no (version 1.2 does not in fact equal version 1.0), it is determined in decision block 520, whether or not the version (version 1.2) is a descendent of B. If the response to decision block 520 is no, the version fails at block 522. If response to decision block 520 is yes (version 1.2 is a descendent of version 1.0), the version passes at block 524.

Referring back to Case 1 in FIG. 11, Version V (version 1.2) does pass the inclusion test. If the response to decision block 512 where no, the present invention would return to decision block 508, as previously described above. Since the response to decision block 512 was yes, it is determined at decision block 526 whether or not the version V is in MISSING. As previously defined, MISSING is initially empty and thus, the response to decision block 526 is no. Therefore, V (version 1.2) is added to TARGETS at block 528 (TARGETS={1.2}). If the response to decision block 526 had been yes, V would have been removed from MISSING at block 530.

The present invention then proceeds to block 532 in which PREVS is set equal to all immediate previous versions of V (version 1.2). Thus for Case 1, PREVS={1.1}. It is then determined at decision block 534 whether or not PREVS is empty. If the response to decision block 534 is yes, the present invention returns to decision block 508 to check the next version in VSET. If the response to decision block 534 is no (PREVS={1.1}, a version P (any of the remaining versions) is removed from PREVS at block 536. The only version that can be removed from PREVS is version 1.1.

It is then determined at decision block 538 whether or not version P passes the inclusion test as shown in FIG. 12. In decision block 514, it is determined that version P (version 1.1) is not an ancestor of B (version 1.0). In decision block 518, it is determined that version P (version 1.1) is not the same as B, and in decision block 520, it is determined that version P (version 1.1) is a descendent of B. Thus version P (version 1.1) passes the inclusion test, and passes to decision block 540 in which it is determined whether or not P is in Targets.

Since TARGETS={1.2} as determined above, the response to decision block 540 is no and P {1.1}, is added at block 542 to MISSING which now equals {1.1}. If the response to decision block 540 had been yes, P (1.1) would have been removed from TARGETS at block 544. Subsequent to blocks 542 and 544, the present invention returns to decision block 534 where it is again determined whether or not PREVS is empty. Since PREVS is now empty (version 1.1 having been removed on the preceding iteration), the response is yes. Thus a return to decision block 508 is executed. VSET is empty, the response to decision block 508 is yes and the present invention returns to block 502. It is determined at block 502 that RSET={C} is not empty and Reason R(C) is removed from RSET at block 504, and RSET is thus empty.

VSET is set equal to {version 1.1} at block 506 and the response to decision block 508 is no. Version V (1.1) is removed at block 510 from VSET (which is thus empty). It is determined at block 512 that V (1.1) passes the inclusion test at decision block 512. Since MISSING={1.1}, it is determined that V (1.1) is in MISSING at decision block 526 and V (1.1) is removed at block 530 from MISSING which is now empty. At block 532, PREVS is set equal to 1.0 and at block 534 it is determined that PREVS is not empty. At block 536 version P (1.0) is removed from PREVS. Version P (1.0) does not pass the inclusion test (since version 1.0=B (version (1.0))and thus, returns to decision block 534. It is then determined at block 534 that PREVS is empty and a return to block 508 is executed.

It is determined at block 508 that VSET is now empty and a return to block 502 is executed. RSET is now empty and the present invention proceeds to decision block 550 where it is determined whether or not MISSING is empty. Since the response to decision block 550 is yes (as previously determined above), it is determined at decision block 552 whether or not there is exactly one version in TARGETS. Since TARGETS was previously set equal to {1.2}, the response to decision block 552 is yes. If the response to block 552 had been no, an unsuccessful completion response due to lack of merger of development would have been received at block 554.

At block 556, T is determined to be the version in Targets, i.e., T=version 1.2. A successful completion is thus determined at block 558, and the present invention has determined that the correct version that contains reasons C and D for promotion to production is version 1.2.

Referring now to FIG. 9, 11 and 12, an example of testing for the correct version to promote when the same reason has been used more than once to create a version is illustrated. The initial conditions are MISSING={}; TARGETS={}; BASELINE=1.0; and RSET={E,F}.

After starting at 500, it is determined at block 502 that RSET is not empty since it contains reasons E and F. At block 504 any reason R (start with F) is removed from RSET (making RSET={E}). At block 506 VSET is set equal to all versions associated with R (VSET={2.2}). Since VSET is not empty, any version V (2.2) is removed from VSET at block 510 (VSET now equals {}). It is determined at block 512 and in FIG. 12 that version V (2.2) passes the inclusion test. At block 526, since MISSING is empty, Version V (2.2) is not in MISSING and version V (2.2) is added to TARGETS at block 528 (TARGETS={2.2}).

At block 532, PREVS is made equal to {2.1}. Since it is determined at block 534 that PREVS is not empty, any version P (version 2.1) is removed making PREVS={}. It is determined at block 538 and in FIG. 12 that P (2.1) passes the inclusion test. It is determined at block 540 that P(2.1) is not in TARGETS (TARGETS=2.2}), and P(2.1) is thus added at block 542 to MISSING (MISSING={2.1}). A return to block 534 is executed and since PREVS={}, it is empty and a return to block 508 is executed.

Figure 1:
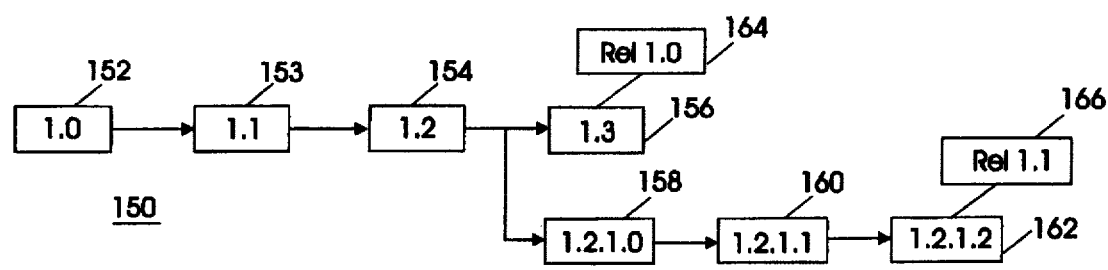
FIG. 1 depicts a block diagram illustrating an example of a branching model known in the prior art.

At block 508, since VSET is empty, a return to block 502 is executed. Since RSET={E}, it is not empty and reason R(E) is removed at block 504 making RSET={}. At block 506, VSET is made equal to 2.1 and 2.3 (VSET={2.1, 2.3}. At block 508, since VSET is not empty, any version V (pick version 2.3) is removed and VSET={2.1}. At block 512 and in FIG. 1.2, it is determined that V (2.3) passes the inclusion test. It is then determined at block 526 that V (2.3) is not in MISSING (MISSING={2.1}) and V (2.3) is added at block 528 to TARGETS (TARGETS={2.2, 2.3}). At block 532 PREVS is made equal to {2.2} and per block 534 PREVS is not empty and thus per block 536 version P (2.2) is removed from PREVS (PREVS={}). P (2.2) passes the inclusion test at block 538 per FIG. 12. Since P (2.2) is in TARGETS (TARGETS={2.2, 2.3}), P(2.2) is removed from TARGETS (TARGETS={2.3}) at block 544. A return to block 534 is executed followed by a return to block 508.

At block 508, VSET {2.1} is not empty and a version V (2.1) is removed making VSET={}. V (2.1) passes the inclusion test and is removed form MISSING (MISSING={}) at block 530. At block 532, PREVS is made equal to 2.0 and version P (2.0) is removed from PREVS (PREVS={}) at block 536. P (2.0) does not pass the inclusion test since P (2.0)=B (2.0). Thus a return to block 534 is executed followed by a return to block 508. Since VSET is now empty, a return to block 502 is made. Since RSET is now empty, the present invention proceeds to block 550 where it is determined that MISSING is empty. At block 552 it is determined that TARGETS={2.3} contains exactly one version and at block 556, T is that version, (i.e., T=2.3). A successful completion is thus determined at block 558, and the present invention has determined that the correct version that contains reasons E and F for promotion to production is Version 2.3 rather than Version 2.2.

Referring to Case 3 of FIG. 10 in conjunction with FIGS. 11 and 12, use of the present invention is illustrated in the situation in which concurrent development has occurred. The initial conditions are; MISSING={}; TARGETS={}; Baseline=3.0; and RSET={G,H}. After starting at 500, it is determined at decision block 502 that RSET is not empty. Any reason R(H) is removed from RSET at block 504. At block 506, VSET is set equal to all versions associated with R (H), thus, VSET={3.2, 3.3}. It is determined at decision block 508 that VSET is not empty and at block 510 any version V (3.3) is removed from VSET (VSET={3.2}). At decision block 512 and per FIG. 12, it is determined that V (3.3) passes the inclusion test.

Since V (3.3) is not in MISSING (MISSING={}), V(3.3) is added to TARGETS at block 528. At block 532, PREVS is set equal to {3.1}. Since PREVS is not empty, version P (3.1) is removed from PREVS at block 536. It is determined at decision block 538 and with FIG. 12 that P (3.1) passes the inclusion test. At decision block 540 it is determined that P (3.1) is not in TARGETS (TARGETS={3.3}). Thus, P (3.1) is added to MISSING at block 542 (MISSING={3.1}). The present invention then returns to decision block 534 and since PREVS is now empty, a return is executed to block 508. It is determined at decision block 508 that VSET is not empty and any version V (3.2) is removed from VSET (VSET={}). It is determined at decision block 512 and with FIG. 12 that V(3.2) passes the inclusion test.

It is determined at decision block 526 that V (3.2) is not in MISSING (MISSING={3.1}). Thus, V (3.2) is added to TARGETS at block 528 (TARGETS={3.2, 3.3}). At block 532, PREVS={3.1}, and it is determined at decision block 534 that PREVS is not empty and therefor, Version P(3.1) is removed from PREVS. It is determined in decision block 538 that P(3.1) does pass the inclusion test. Since P(3.1) is not in TARGETS (TARGETS={3.2, 3.3}), P(3.1) is added at block 542 to MISSING (MISSING={3.1}). Thus, the present invention returns to decision block 534 followed by a return to decision block 508. Since VSET is now empty, the present invention returns to block 502.

It is determined at block 502 that RSET is not empty (RSET={G}). At block 504, any reason R (G) is removed from RSET (RSET={}). At block 506, VSET={3.1}, and since VSET is not empty, any version V (3.1) is removed from VSET (VSET={}).

It is then determined at decision block 512 and in FIG. 12 that V (3.1) does pass the inclusion test. Since V(3.1) is in MISSING (MISSING={3.1}), V(3.1) is removed from MISSING (MISSING={}) at block 530. PREVS is set equal to {3.0} at block 532 and since PREVS is not empty, version P(3.0) is removed from PREVS (PREVS={}) at block 536. Since P(3.0) does not pass the inclusion test (P(3.0)=B(3.0)), a return to block 534 is executed. Since PREVS is empty, a return to block 508 is executed followed by a return (VSET is empty) to block 502. Since RSET is empty, the present invention continues to block 550. Since MISSING={}, it is empty, and it is determined at block 552 that there is more than one version in TARGETS (TARGETS={3.2, 3.3}). Thus a message indicating successful completion is returned at block 554. Therefore, the present invention has correctly identified that the Case 3 example has not completed a merge of all concurrent development and until such a merger is completed, there is no correct version to promote to production.

Referring now to FIGS. 9, 11 and 12, an example of testing for the correct version to promote when a required reason is missing is illustrated. In this example, a user has asked that the changes made for reason F be moved to production, replacing the version already there (version 2.0).

After starting at 500, it is determined at block 502 that RSET is not empty since it contains reason F. At block 504 any reason R (F) is removed from RSET (making RSET={}). At block 506 VSET is set equal to all versions associated with R (VSET={2.2}). Since VSET is not empty, any version V (2.2) is removed from VSET at block 510 (VSET now equals {}). It is determined at block 512 and in FIG. 12 that version V (2.2) passes the inclusion test. At block 526, since MISSING is empty, Version V (2.2) is not in MISSING and version V (2.2) is added to TARGETS at block 528 (TARGETS={2.2}).

At block 532, PREVS is made equal to {2.1}. Since it is determined at block 534 that PREVS is not empty, any version P (version 2.1) is removed making PREVS={}. It is determined at block 538 and in FIG. 12 that P (2.1) passes the inclusion test. It is determined at block 540 that P (2.1) is not in TARGETS (TARGETS=2.2}), and P(2.1) is thus added at block 542 to MISSING (MISSING={2.1}). A return to block 534 is executed and since PREVS={}, it is empty and a return to block 508 is executed.

At block 508, since VSET is empty, a return to block 502 is executed. Since RSET is empty the present invention moves to decision block 550 where it is determined that MISSING is not empty. The present invention moves to block 600.

At block 600, RSONS is made equal to {}. At block 602, any version V(2.1) is removed from MISSING (MISSING={}). In block 604, all reasons associated with version 2.1 are added to RSONS. Since version 2.1 was created only for reason E, RSONS is now equal to {E}.

In block 606, MISSING is checked to see if it is empty. If the answer is no, the present invention continues to block 608. If the answer if yes, the present invention returns to block 602. Since MISSING is empty, the present invention continues to block 608. Thus a message indicating unsuccessful completion is returned at block 608. The present invention has correctly determined that in this case, changes for reason F cannot be moved to production without also moving changes made for reason E (the reason in RSONS). Since reason E was not in the original list of changes to be moved to production (the initial value of RSET was {F}), the present invention will return an error.

One prior art application, Configuration Management Version Control (CMVC) from IBM™ describes how to apply a set of reasons to a baseline version to determine either (1) the resulting version (incorporating not only the baseline version but exactly all changes made for one or more of the reasons) or, failing that, (2) a new set of reasons whose associated changes are required in order to successfully complete (1). Unfortunately, CMVC assumes only the simple versioning capability of SCCS, a simple versioning utility available with most UNIX™ variants. As library management systems have become more complex, so have the versioning capabilities of those systems. These new versioning schemes break several assumptions of the original prior art, namely: (1) any number of versions can be based off a single version and (2) a single version can be based on the merge of two or more versions (in practice, it's usually only two). This results in version histories that can be graphs of any complexity and form, except that of course, a version can not be its own ancestor.

The present invention extends the prior art in two ways. First, the algorithm can be applied to a version history of any complexity, not just the restricted branching model in SCCS. Second, because library management systems can support concurrent development, an error condition not possible with CMVC must be detectable: it is possible that the changes associated with the given reason set are concurrent and have not yet been merged.

Not only can the present invention be used by itself but it can be used in conjunction with other Library Management systems in two ways.

Figure 2:
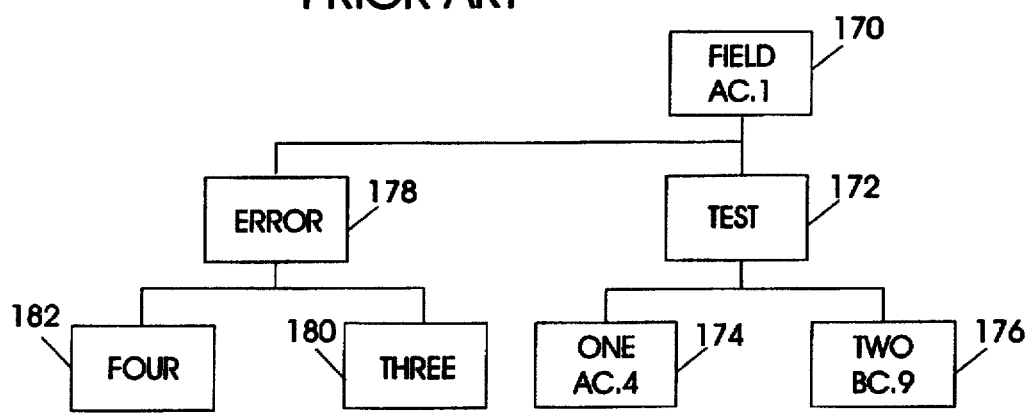
FIG. 2 is a block diagram illustrating an example of an hierarchial promotion model known in the prior art.

The versioning schemes in library management systems usually work at an abstract level. For example, PVCS (library management system from Intersolv™) supports the notions of system-wide labels and of a promotion hierarchy. These offer users an indirect, high level interface to specify versions of many objects in terms familiar to the user. Further, PVCS offers a user interface that easily manages these indirect, high-level version names. This user interface can be easily extended by the present invention. For example, in addition to promoting a set of objects from Test to Field (see FIG. 2), the present invention would allow the user to promote a set of enhancements (known by a set of change codes) to Field.

As another example, the versioning and configuration management capabilities of ENVY (a library management tool for Smalltalk™ development from OTI™ (Object Technology International of Canada)) support the notion of releasing a set of method versions to a class, a set of class versions to an application and a set of application versions to a configuration map. With the exception of the method versions, all of the other versions must be explicitly named by the user. While this makes system builds and code reuse very simple, it does require a good deal more work on the part of the developer. The present invention can be used to simplify the developer's work. Instead of having to identify each version of each object to be released to a build, the developer can indicate that ENVY is to release a set of reasons. The currently released versions would be used as a baseline and the target versions (as determined by the present invention) be released.

The present invention can extend the current behavior of existing library management systems in a second way. Actions like "promote" in PVCS and "release" in ENVY involve the user identifying a target version upon which the library manager is to act. This action often has an implicit baseline and from these two versions (baseline and target) it is easy to identify the set of changes between the baseline and target. From that set of changes a set of associated reasons can be deduced. The present invention can be used to determine the actual target version, given the baseline version and the calculated set of reasons. The library management system can then compare the calculated target with the actual target specified by the user. If the two are different or if the present invention detects an error condition, the user has requested an action that is not consistent or complete with respect to the known reasons for change.

Although the present invention has been described with respect to a specific preferred embodiment thereof, various changes and modifications may be suggested to one skilled in the art, and it is intended that the present invention encompass such changes and modifications as fall within the scope of the appended claims.

What we claim is:

1. A method for selecting in a data processing system one target version out of a plurality of versions, the one target version containing exactly those user designated changes to a baseline version, comprising the steps of:

specifying a set of reasons for change;

determining a set of all versions associated with at least one reason in said set of reasons for change, said set of all versions comprising a subset of said plurality of versions;

determining a set of targets comprising any version in said set of all versions with no descendant in said set of all versions;

determining a set of missing versions comprising any version in said plurality of versions but not in said set of all versions that is a descendant of the baseline version and has one version in said set of targets as an ancestor; and successfully determining said one target version if said set of targets comprises only a single version and said set of missing versions is empty, wherein said single version in said set of versions is said one target version.

2. The method of claim 1, further comprising the step of:
    returning a results message to a user.

3. The method of claim 2, further comprising the step of:
    if said message is an unsuccessful result, listing any missing reason that caused said unsuccessful result.

4. The method of claim 2, further comprising the step of:
    if said set of target, comprises two or more versions, returning an error message to the user.

5. A system for selecting in a data processor one target version out of a plurality of versions, the one target version containing exactly those user designated changes to a baseline version, comprising:

means for specifying set of reasons for change;

means for determining a set of all versions associated with at least one reason in said set of reasons for change, said set of all versions comprising a subset of said plurality of versions;

means for determining a set of targets comprising any version in said set of all versions with no descendant in said set of all versions;

means for determining a set of missing versions comprising any version in said plurality of versions but not in said set of all versions that is a descendant of the baseline version and has one version in said set of targets as an ancestor; and means for successfully determining said one target version if said set of targets comprises only a single version and said set of missing versions is empty, wherein said single version in said set of versions is said one target version.

6. The System of claim 5, further comprising:
    means for returning a results message to a user.

7. The System of claim 6, further comprising:
    if said message is an unsuccessful result, means for listing any missing reason that caused said unsuccessful result.

8. The System of claim 6, further comprising:
    if said set of targets comprises two or more versions, means for returning an error message to the user.

9. A computer program product recorded on computer readable medium for selecting in a data processor one target version out of a plurality of versions, the one target version containing exactly those user designated changes to a baseline version, said product comprising:

computer readable means for specifying set of reasons for change;

computer readable means for determining a set of all versions associated with at least one reason in said set of reasons for change, said set of all versions comprising a subset of said plurality of versions;

computer readable means for determining a set of targets comprising any version in said set of all versions with no descendant in said set of all versions;

computer readable means for determining a set of missing versions comprising any version in said plurality of versions but not in said set of all versions that is a descendant of the baseline version and has one version in said set of targets as an ancestor; and computer readable means for successfully determining said one target version if said set of targets comprises only a single version and said set of missing versions is empty, wherein said single version in said set of versions is said one target version.

10. The computer program product of claim 9, further comprising:
    computer readable means for returning a result message to a user.

11. The computer program product of claim 10, further comprising:
    if said message is an unsuccessful result, computer readable means for listing any missing reason that caused said unsuccessful result.

12. The computer program product of claim 11, further comprising:
    if said set of targets comprises two or more versions, computer readable means for returning an error message to the user.

* * * * *